(12) United States Patent
Inoue et al.

(10) Patent No.: US 6,572,136 B2
(45) Date of Patent: Jun. 3, 2003

(54) AUTOMOTIVE AIR BAG SYSTEM

(75) Inventors: Masanori Inoue, Wako (JP); Hiroshi Tatezawa, Tokyo (JP); Takeki Minamikawa, Tokyo (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/906,863

(22) Filed: Jul. 16, 2001

(65) Prior Publication Data

US 2002/0008369 A1 Jan. 24, 2002

(30) Foreign Application Priority Data

Jul. 17, 2000 (JP) .................................. 2000-215638

(51) Int. Cl.[7] .............................................. B60R 21/20
(52) U.S. Cl. ..................................... 280/728.2; 280/732
(58) Field of Search ............................ 280/728.1, 728.2, 280/732, 743.1

(56) References Cited

U.S. PATENT DOCUMENTS

| 5,398,960 | A | * | 3/1995 | Ravenberg et al. | 280/728.2 |
|---|---|---|---|---|---|
| 5,403,034 | A | * | 4/1995 | Gans et al. | 280/728.3 |
| 5,445,409 | A | * | 8/1995 | Abramczyk et al. | 280/728.2 |
| 5,470,100 | A | * | 11/1995 | Gordon | 280/728.2 |
| 5,527,064 | A | * | 6/1996 | Kai et al. | 280/728.2 |
| 5,538,277 | A | * | 7/1996 | Frary et al. | 280/728.2 |
| 5,603,524 | A | * | 2/1997 | Barnes et al. | 280/728.2 |
| 5,664,801 | A | * | 9/1997 | Gray et al. | 280/728.2 |
| 5,669,626 | A | * | 9/1997 | Bartos et al. | 280/728.2 |
| 5,676,390 | A | * | 10/1997 | Olson | 280/728.2 |
| 5,687,989 | A | * | 11/1997 | Maesing et al. | 280/728.2 |
| 5,755,458 | A | * | 5/1998 | Donovan | 280/728.1 |
| 6,120,055 | A | * | 9/2000 | Cuevas et al. | 280/728.2 |
| 6,237,936 | B1 | * | 5/2001 | Quade et al. | 280/728.2 |

FOREIGN PATENT DOCUMENTS

JP 6-32226 4/1994

OTHER PUBLICATIONS

English Language Abstract of Japanese UM Laid Open Publication No. 06–32226, Apr. 26, 1994.

* cited by examiner

Primary Examiner—Paul N. Dickson
Assistant Examiner—Deanna Draper
(74) Attorney, Agent, or Firm—MacPherson Kwok Chen & Heid LLP

(57) ABSTRACT

To facilitate the mounting and removing an automotive air bag system to and from a vehicle body, the air bag system comprises a detachable hinge formed between a part of the air bag housing and a fixed member of a vehicle body, and a releasable latch device provided in the housing. The latch device is adapted to latch onto a striker member integrally formed in the fixed member in a detachable manner. Thus, the mounting of the air bag system can be easily accomplished by first engaging the hinge, and then latching the latch device onto the striker member. The removal of the air bag system can be accomplished equally easily by reversing this process.

5 Claims, 3 Drawing Sheets

AUTOMOTIVE AIR BAG SYSTEM

TECHNICAL FIELD

The present invention relates to an arrangement for securing an automotive air bag system to a vehicle part.

BACKGROUND OF THE INVENTION

It has been customary to use fasteners such as threaded bolts, that can be unfastened when required, for installing an air bag system including a housing accommodating an inflator and an air bag in a position opposite to the vehicle occupant such as a dashboard and a steering wheel. Typically, the housing of the air bag system is attached to a steering hanger beam hidden behind the dashboard. Japanese UM laid open publication No. 06-32226 discloses such an arrangement.

However, the space between the hanger beam and the dashboard is very limited, and provides poor access for the fastening tool. Therefore, the installation work tends to be time consuming and requires a significant amount of effort for the worker.

When the vehicle is put out of use, it is desirable to remove the air bag system from the vehicle because the propellant in the air bag system is required to be properly processed, and the component parts may be recycled. It is therefore desirable that the air bag system is easy to be dismantled.

BRIEF SUMMARY OF THE INVENTION

In view of such problems of the prior art, a primary object of the present invention is to provide an air bag system which is easy to install.

A second object of the present invention is to provide an air bag system which is easy to remove.

According to the present invention, such objects can be accomplished by providing an automotive air bag system, comprising: a housing accommodating an air bag and an inflator; a detachable hinge formed between a part of the housing and a fixed member of a vehicle body; and a releasable latch device provided in the housing in a spaced relationship to the detachable hinge, the latch device being adapted to latch onto a striker member integrally formed in the fixed member in a detachable manner.

Thus, when installing the air bag system, the hinge is engaged, and the housing is pivoted around the hinge so as to latch the latch device onto the striker member. The removable of the air bag system can be equally easily accomplished by unlatching the latch device, and then disengaging the hinge. The fixed member of the vehicle body typically consists of a steering hanger beam extending laterally across the vehicle body. However, the fixed member may also consist of a suitable member provided in a steering wheel, or any part of the vehicle body suitable for mounting the air bag system.

According to a preferred embodiment of the present invention, the detachable hinge comprises a laterally extending open slot which is adapted to receive a hinge pin integrally formed in the fixed member. Thus, the hinge can be engaged and disengaged by turning the housing so as to properly orient the open slot.

According to a preferred embodiment of the present invention, the latch device comprises a pivotally supported latch member, a first spring member resiliently urging the latch member to an unlatching position, a retaining member for retaining the latch member at a latching position, a second spring member for urging the retaining member to a retaining position for retaining the latch member at the latching position, and a knob member for moving the retaining member against a spring force of the second spring member to a releasing position for allowing the retaining member to move to the unlatching position under a spring force of the first spring member.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
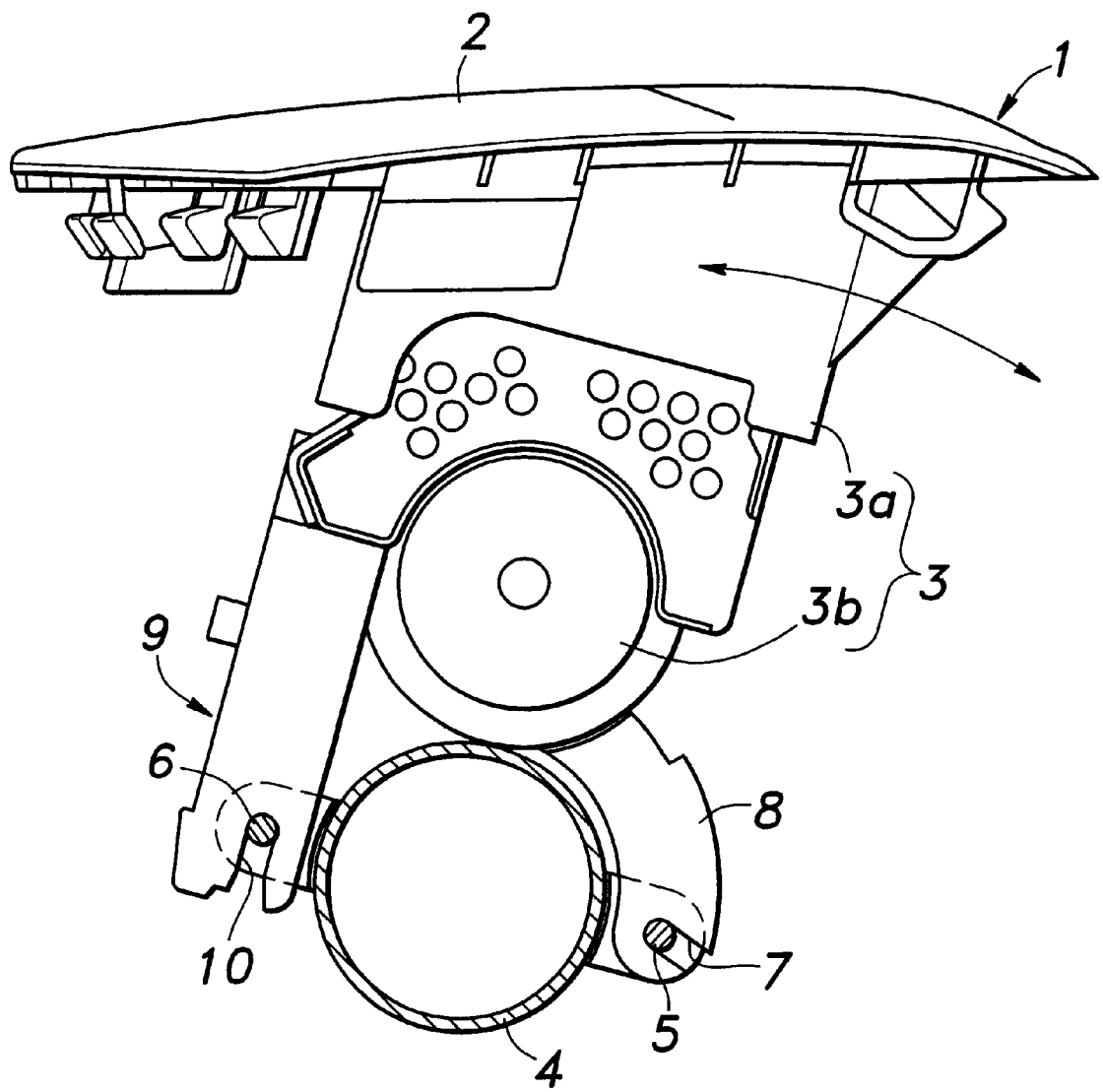
FIG. 1 is a side view of an air bag system embodying the present invention.

The air bag system 1 illustrated in FIG. 1 comprises a lid 2 which is fitted into a corresponding opening formed in a vehicle dashboard not shown in the drawing, and a housing 3 including a compartment 3a for stowing an air bag and an inflator 3b depending from the bottom wall of the compartment 3a and containing a propellant for inflating the air bag. The air bag system 1 is by itself known, and reference should be made to prior patent publications such as Japanese UM laid open publication No. 06-32226 for the details thereof.

The air bag system 1 is attached to a steering hanger beam 4 made of a pipe member which extends between the right and left front side panel inner members inside the dashboard. A hinge pin 5 extends along the front side of the steering hanger beam 4 in a parallel and spaced relationship with two ends of the hinge pin 5 supported by a pair of brackets integrally extending from the steering hanger beam 4. A striker pin 6 similarly extends along the rear side of the steering hanger beam 4 in a parallel and spaced relationship with two ends of the striker pin 6 supported by a pair of brackets integrally extending from the steering hanger beam 4.

An arcuate arm 8 extends from a lower part of the housing 3 and along an arcuate profile of the steering hanger beam 4. A free end of the arcuate arm 8 is provided with a forwardly directed slot 7 which has an open end in a forward and lower part of the arm 8, and extends obliquely. The hinge pin 5 is received in this slot 7. A latch device 9 extends downward from a lower part of the housing 3, and passes the opposite or rear side of the steering hanger beam 4. A free end of the latch device 9 is provided with a downwardly directed slot 10 which receives the striker pin 6 with a latching action as described hereinafter.

Figure 2:
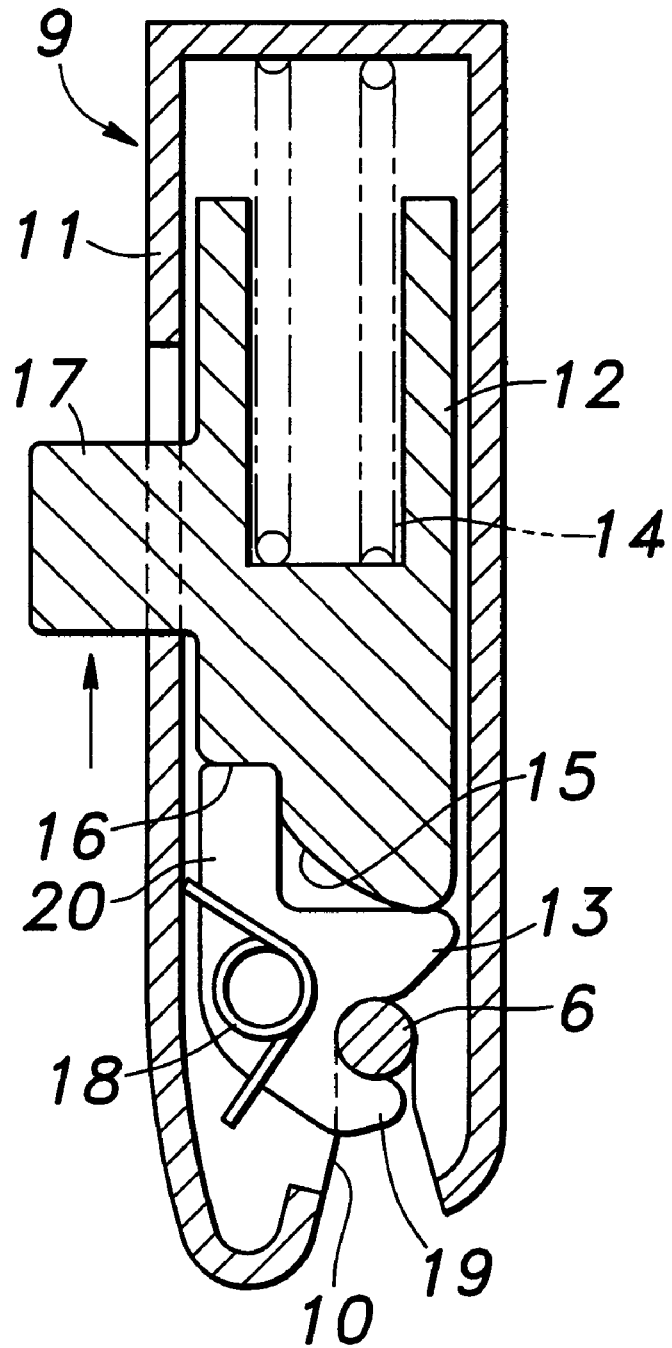
FIG. 2 is an enlarged sectional view of the latch device of the air bag system shown in FIG. 1 in the latched state.

Referring to FIG. 2, the latch device 9 comprises a vertically enlongated case 11 having a rectangular cross section and formed with the downwardly directed slot 10 at a free end thereof for receiving the striker pin 6, a retaining member 12 slidably received in the case 11, and a rotatable latch member 13 pivotally supported in a lower part of the case 11.

The retaining member 12 is resiliently urged in the downward direction by a compression coil spring 14 interposed between an upper wall of the case 11 and the retaining member 12. The retaining member 12 is provided with a cam surface 15 formed in a lower end thereof, a notch 16 formed slightly above the cam surface 15, and a knob 17 formed in an intermediate part of the retaining member 12 and laterally extending out of a slot formed in the case 12. The rotatable latch member 13 is resiliently urged by a torsion coil spring 18 wound around a support shaft thereof in clockwise direction as seen in the drawing, and is provided with a lock pawl 19 engaging the striker pin 6 and a stopper projection 20 engaging the notch 16 of the retaining member 12.

The mode of mounting and removing the air bag system 1 described above to and away from the steering hanger beam 4 is now described in the following.

Figure 3:
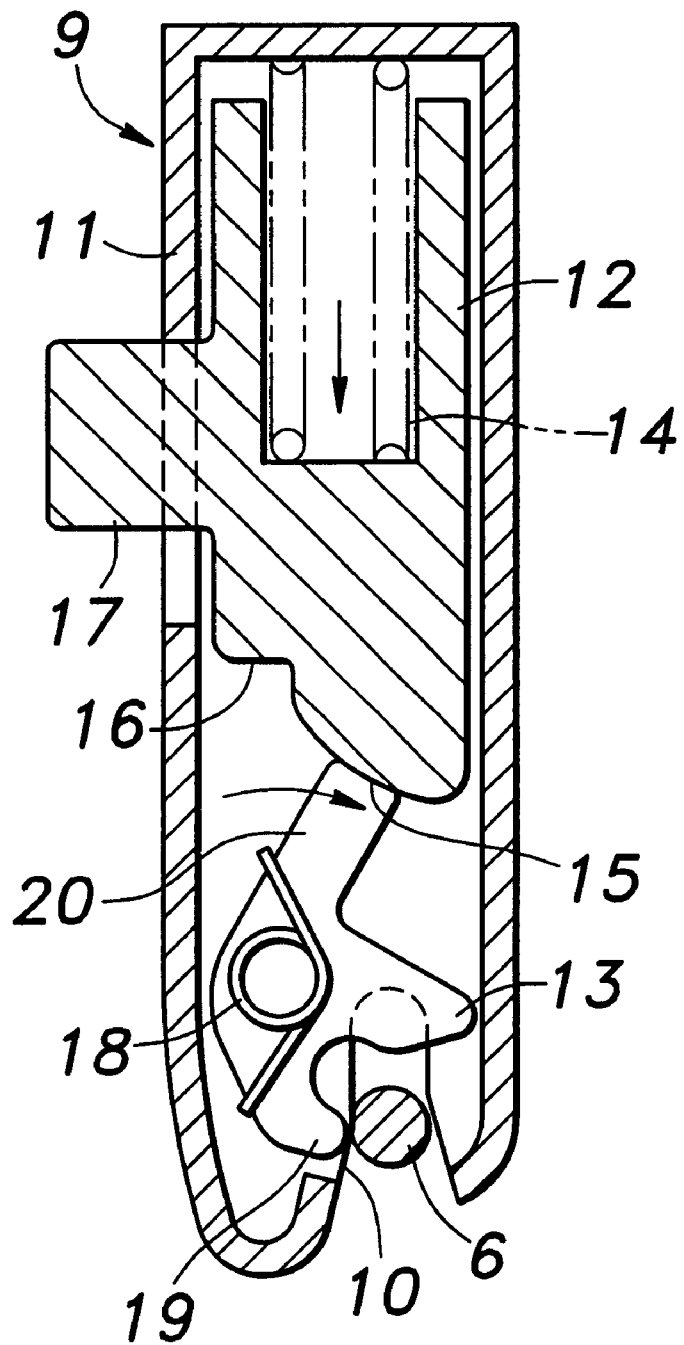
FIG. 3 is a view similar to FIG. 2 showing the state of the latch device in the unlatched state.

Before the air bag system 1 is mounted to the steering hanger beam 4, the latch device 9 is in the state illustrated in FIG. 3 or the lock projection 20 abuts the cam surface 15, and the rotatable latch member 13 has turned clockwise under the resilient force of the torsion coil spring 18. Therefore, the lock pawl 19 is outside the downwardly directed slot 10, and the stopper projection 20 engages the cam surface 15 of the retaining member 12 so that the retaining member 12 is retained at a raised position.

First of all, the open end of the forwardly directed slot 7 of the arcuate arm 8 is oriented vertically so as to align with the hinge pin 5, and is pushed inwardly all the way until the hinge pin 5 is fully received in the forwardly directed slot 7. The housing 3 is then turned counter clockwise around the hinge pin 5 as seen in FIG. 1. As the housing 3 is turned counter clockwise around the hinge 5, the open end of the downwardly directed slot 10 receives the striker pin 6, and the striker pin 6 pushes the rotatable latch member 13 against the biasing force of the torsion coil spring 18. The stopper projection 20 slides along the cam surface 15, and eventually engages the notch 16 of the retaining member 12 as illustrated in FIG. 2. Because the retaining member 12 is resiliently urged downward, the rotatable latch member 13 is retained at this position. As a result, the striker pin 6 is held between the bottom of the downwardly directed slot 10 and the lock pawl 19 of the rotatable latch member 13 so that the striker pin 6 is securely latched by the latch device 9, and the air bag system 1 is firmly secured to the steering hanger beam 4.

When the air bag system 1 is desired to be removed from the steering hanger beam 4, the knob 17 of the retaining member 12 is pushed up manually or by using a suitable tool so as to move the retaining member 12 upward. This releases the stopper projection 20 of the rotatable latch member 13 from the notch 16 of the retaining member 12 so that the housing 3 can be turned clockwise as seen in FIG. 1 around the hinge pin 5, and the striker pin 6 is moved out of the downwardly directed slot 10. Once the housing 3 has been turned about 90 degrees, the hinge pin 5 can be released from the forwardly directed slot 7, which is oriented vertically at this time point, by raising the housing 3 upward, and the air bag system 1 can be thereby entirely detached from the steering hanger beam 4.

The arm 8 and latch device 9 were each described as singular in the foregoing description, but it is obvious to a person skilled in the art that each of them may be two or more in number as desired.

According to this embodiment, the mounting of the air bag system is simplified, and this contributes to the improvement in the production efficiency of the vehicle. Also, when scrapping the vehicle, the air bag system can be easily removed for reuse or a safe disposal.

Although the present invention has been described in terms of a preferred embodiment thereof, it is obvious to a person skilled in the art that various alterations and modifications are possible without departing from the scope of the present invention which is set forth in the appended claims.

What is claimed is:

1. An automotive air bag system, comprising:

a housing accommodating an air bag and an inflator;

a detachable hinge formed between a part of said housing and a side of a steering hanger beam extending laterally across a vehicle body; and a releasable latch device provided in said housing in a spaced relationship to said detachable hinge, said latch device configured to latch onto a striker member integrally formed on an opposite side of said steering hanger beam in a detachable manner said latch device including a pivotally supported latch member, a spring member resiliently urging said latch member to an unlatching position, and a retaining member for retaining said latch member at a latching position; said latch device further including a second spring member for urging said retaining member to a retaining position for retaining said latch member at said latching position, and a knob member for moving said retaining member against a spring force of said second spring member to a releasing position for allowing said retaining member to move to said unlatching position under a spring force of said first spring member.

2. An automotive air bag system according to claim 1, wherein said detachable hinge comprises a laterally extending open slot configured to receive a hinge pin integrally formed in said steering hanger beam.

3. An automotive air bag system, comprising:

a housing accommodating an air bag and an inflator;

a detachable hinge formed between a part of said housing and a fixed member of a vehicle body; and a releasable latch device provided in said housing in a spaced relationship to said detachable hinge, said latch device being adapted to latch onto a striker member integrally formed in said fixed member in a detachable manner, wherein said latch device comprises a pivotally supported latch member, a spring member resiliently urging said latch member to an unlatching position, and a retaining member for retaining said latch member at a latching position, and wherein said latch device further comprises a second spring member for urging said retaining member to a retaining position for retaining said latch member at said latching position, and a knob member for moving said retaining member against a spring force of said second spring member to a releasing position for allowing said retaining member to move to said unlatching position under a spring force of said first spring member.

4. An automotive air bag system according to claim 3, wherein said detachable hinge comprises a laterally extending open slot which is adapted to receive a hinge pin integrally formed in said fixed member.

5. An automotive air bag system according to claim 3, wherein said fixed member of the vehicle body comprises a steering hanger beam extending laterally across the vehicle.

* * * * *